(12) United States Patent
Lim et al.

(10) Patent No.: US 9,812,998 B2
(45) Date of Patent: Nov. 7, 2017

(54) METHOD FOR CONTROLLING INVERTER

(71) Applicant: LSIS CO., LTD., Gyeonggi-do (KR)

(72) Inventors: Deok-Young Lim, Gyeonggi-do (KR); Chun-Suk Yang, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/171,690

(22) Filed: Jun. 2, 2016

(65) Prior Publication Data

US 2016/0359432 A1 Dec. 8, 2016

(30) Foreign Application Priority Data

Jun. 2, 2015 (KR) ........................ 10-2015-0077710

(51) Int. Cl.
*H02P 21/00* (2016.01)
*H02P 3/18* (2006.01)
*H02M 1/32* (2007.01)
*H02P 21/36* (2016.01)
*F16P 3/00* (2006.01)
*H02P 27/00* (2006.01)

(52) U.S. Cl.
CPC .................. *H02P 3/18* (2013.01); *F16P 3/00* (2013.01); *H02M 1/32* (2013.01); *H02P 21/36* (2016.02); *H02P 27/00* (2013.01); *H02M 2001/322* (2013.01)

(58) Field of Classification Search
CPC .. H02H 7/122; H02M 2001/322; H02M 1/32; H02P 3/18
See application file for complete search history.

(56) References Cited

U.S. PATENT DOCUMENTS 5,465,202 A * 11/1995 Ibori ..................... H02H 3/247
363/34
8,502,489 B2 8/2013 Ooto et al.
(Continued)

FOREIGN PATENT DOCUMENTS

DE 102007022515 A1 11/2008
EP 1148611 A2 10/2001
(Continued)

OTHER PUBLICATIONS

European Search Report dated Oct. 21, 2016 corresponding to application No. 16169576.1-1806.
(Continued)

*Primary Examiner* — Karen Masih
(74) *Attorney, Agent, or Firm* — Nath, Goldberg & Meyer; Jerald L. Meyer; Annie J. Kock

(57) ABSTRACT

In some embodiments, an inverter control apparatus and a method for controlling the same are provided. The inverter control apparatus may speed up the discharging of the residual energy at an inverter driven with an input power when a safety signal is input to the inverter. The inverter control apparatus may include an input power switchgear supplying an input power to the inverter according to switching operation; an I/O unit inputting a safety signal to the inverter according to a user control input and outputting a failure output relay signal to the input power switchgear when the safety signal is generated; and a controller performing speeding up the discharge of residual energy at the inverter when the input power is interrupted.

9 Claims, 8 Drawing Sheets

(56) References Cited

U.S. PATENT DOCUMENTS

| | | |
|---|---|---|
| 8,508,066 B2 | 8/2013 | Lee et al. |
| 2011/0210687 A1 | 9/2011 | Tsuji et al. |
| 2012/0055727 A1* | 3/2012 | Omiya .................. B60K 6/445 180/279 |

FOREIGN PATENT DOCUMENTS

| | | |
|---|---|---|
| JP | H0970196 A | 3/1997 |
| JP | 2004015892 A | 1/2004 |
| JP | 3689313 B2 | 8/2005 |
| JP | 2014227169 A | 12/2014 |
| KR | 10-0841651 B1 | 6/2008 |
| KR | 10-2011-0045426 A | 5/2011 |
| KR | 20-2011-0004389 U | 5/2011 |
| KR | 10-2011-0069815 A | 6/2011 |

OTHER PUBLICATIONS

Japanese Office Action dated Aug. 1, 2017 corresponding to application No. 2016-110695.

* cited by examiner

PRIOR ART

METHOD FOR CONTROLLING INVERTER

CROSS REFERENCE TO RELATED APPLICATIONS

This application claims the benefit of Korean Patent Application No. 10-2015-0077710, filed on Jun. 2, 2015, entitled "METHOD FOR CONTROLLING INVERTER", which is hereby incorporated by reference in its entirety.

BACKGROUND

Technical Field

The present disclosure relates to methods for controlling an inverter. More specifically, the present disclosure relates to methods for controlling an inverter to interrupt an input power and speed up discharge of residual energy at a smoothing stage when the inverter is stopped for an emergency.

Description of the Related Art

An inverter is used for driving an induction motor by receiving DC power to convert it to AC power with a switching element and supplying the AC power to the induction motor. The inverter generates pulse width modulation (PWM) signal and controls the switching element with the PWM signal to generate AC power. Then, the inverter controls the pulse width of the PWM signal to change the voltage and frequency of AC power and change the torque and rotation speed of the induction motor as desired.

If a safety signal is input to an inverter while it is driven, the input power to the inverter has to be interrupted for safety. However, the inverter stands by in a safety trip mode until an operator interrupts the input power, and thus there is a risk of a secondary accident. Moreover, even after the operator has interrupted the input power to the inverter, residual energy remains in a smoothing stage, and thus there is a time delay unit the service is provided.

FIG. 1 is a graph showing voltage profile of a smoothing stage as the input power to the inverter is turned on/off when a safety signal is input.

Referring to FIG. 1, when voltage is applied to an inverter, the voltage is gradually charged at a smoothing stage during an initial charging circuit operation, and an SMPS begins to operate (①). Then, the smoothing stage is continuously charged, and an initial charge relay operates such that the smoothing stage is charged up to the input power (②).

Then, if a safety signal is input to an I/O unit (③), the inverter enters a safety trip mode and stands by. Then, when an operator interrupts the input power (④), the energy remaining in the smoothing stage is gradually discharged.

Then, when the energy remaining in the smoothing stage is discharged such that the voltage of the smoothing stage becomes a predetermined voltage (⑤), the inverter triggers a low voltage trip. In the low voltage trip mode, the inverter stops operating and the initial charge relay does not operate, and thus the discharging of the smoothing stage becomes slower. Then, the residual energy remaining at the smoothing stage continues to be discharged and the SMPS is turned off (⑥), such that the discharging of the smoothing stage becomes even slower.

As such, it takes longer time to discharge the residual energy at the smoothing stage, and thus resuming of the service is delayed.

There has been proposed a method for discharging the residual energy at the smoothing stage by using a discharge resistor when the inverter is stopped for an emergency. However, the discharge resistor occupies large volume and there is a risk of electric shock when attaching the discharge resistor to the smoothing stage.

SUMMARY

It is an aspect of some embodiments of the present disclosure to provide a method for reducing the risk of secondary accidents such as electric shock by interrupting input power when an inverter is stopped for an emergency.

It is another aspect of some embodiments of the present disclosure to provide a method for reducing a time taken for resuming service by an inverter by speeding up discharge of energy remaining at a smoothing stage when the inverter is stopped for an emergency.

It is an aspect of some embodiments of the present disclosure to provide a method for quickly discharging residual energy at a smoothing stage of an inverter without requiring any additional element such as a discharge resistor used in the related art.

In accordance with one aspect of some embodiments of the present disclosure, an inverter control apparatus for speeding up the discharging of the residual energy at an inverter driven with an input power when a safety signal is input to the inverter includes an input power switchgear supplying an input power to the inverter according to switching operation; an I/O unit inputting a safety signal to the inverter according to a user control input and outputting a failure output relay signal to the input power switchgear when the safety signal is generated; and a controller performing speeding up the discharge of residual energy at the inverter when the input power is interrupted.

The input power switchgear may receive a failure output relay signal from the I/O unit to interrupt the input power.

The control apparatus may further include a fan driving unit that drives the fan when the input power is interrupted.

The controller may include a rotational coordinate system conversion unit that converts currents in an abc coordinate system output from the inverter to currents in a rotational coordinate system; a current control unit that generates a voltage command using a current command and the output current from the rotational coordinate system conversion unit to apply it to a stationary coordinate system conversion unit; and the stationary coordinate system conversion unit that converts the voltage command in the rotational coordinate system received from the current control unit to a voltage command in the stationary coordinate system to provide it to the inverter.

The current command input to the current control unit may include a d-axis current command including a value equal to the voltage of the smoothing stage of the inverter and a q-axis current command including a value equal to zero.

The controller may further include a zero vector output unit that receives the failure output relay signal to output a zero vector.

In accordance with another aspect of some embodiments of the present disclosure, a method for controlling an inverter driven with an input power, to speed up residual energy discharge at the inverter when a safety signal is input to the inverter, includes: determining whether the safety signal is input to the inverter; generating an I/O failure output relay signal to interrupt the input power if it is determined that the safety signal is input; and performing a process of discharging residual energy at a smoothing stage of the inverter and fan drive.

When the inverter performs current control, the process of discharging the residual energy may include: performing a DC excitation process; determining whether a low voltage trip is triggered in the inverter; and determining whether a voltage of the smoothing stage of the inverter is less than a predetermined voltage.

The performing the DC excitation process may include: converting currents in an abc coordinate system output from the inverter to currents in a rotational coordinate system; generating a voltage command in the rotational coordinate system by using the currents in the rotational coordinate system and a current command; converting the voltage command in the rotational coordinate system to the voltage command in a stationary coordinate system; and applying the voltage command in the stationary coordinate system to the inverter.

The current command may include a d-axis current command including a value equal to the voltage of the smoothing stage of the inverter and a q-axis current command including a value equal to zero.

The determining whether the low voltage trip occurs in the inverter may include resuming the DC excitation process and the fan drive if it is determined that the low voltage trip occurs.

The determining whether the voltage at the smoothing stage of the inverter is less than the predetermined voltage may include completing the DC excitation process and the fan drive if it is determined that the voltage of the smoothing stage of the inverter is less than the predetermined voltage.

The predetermined voltage may be larger than an SMPS_off voltage of the inverter.

When the inverter performs V/F control, the process of discharging the residual energy may include: performing zero vector drive; determining whether a low voltage trip is triggered in the inverter; and determining whether a voltage of the smoothing stage of the inverter is less than a predetermined voltage.

The determining whether the low voltage trip occurs in the inverter may include resuming the zero vector drive and the fan drive if it is determined that the low voltage trip occurs.

The determining whether the voltage at the smoothing stage of the inverter is less than the predetermined voltage may include completing the zero vector drive and the fan drive if it is determined that the voltage of the smoothing stage of the inverter is less than the predetermined voltage.

The predetermined voltage may be larger than an SMPS_off voltage of the inverter.

As set forth above, the risk of secondary accidents such as electric shock when an inverter is stopped for an emergency can be reduced.

In addition, according to an embodiment of the present disclosure, residual energy at a smoothing stage of an inverter can be quickly discharged when the inverter is stopped for an emergency even without requiring any additional element such as a discharge resistor or a sensor.

Accordingly, a time taken for resuming service by an inverter can be shortened.

DETAILED DESCRIPTION

Figure 1:
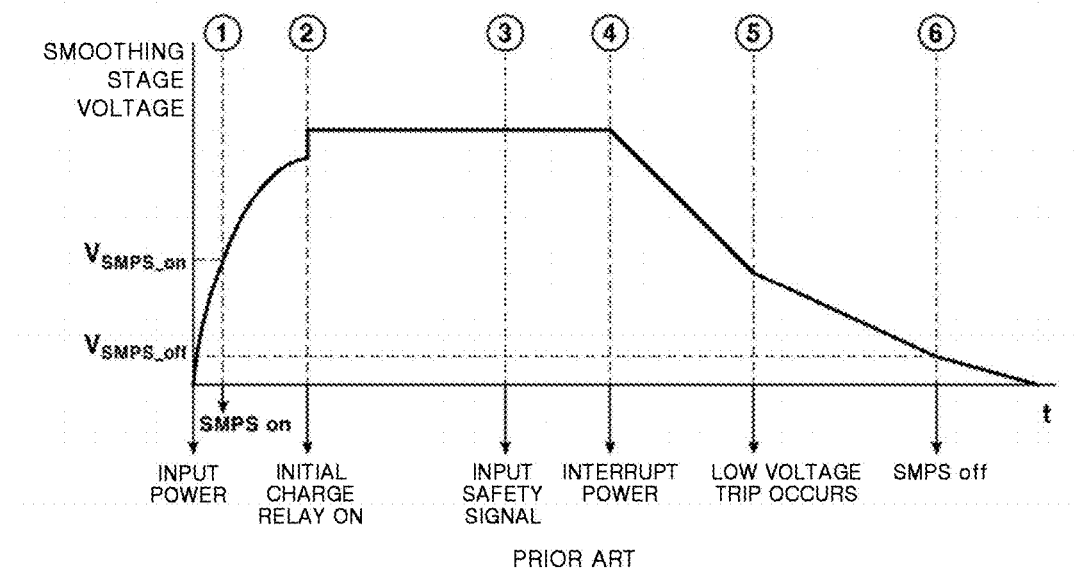
FIG. 1 is a graph showing a smoothing stage voltage profile when a safety signal is input to an inverter according to the prior art.

Terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way. Therefore, while the present disclosure is described with reference to the certain particular embodiments and the accompanying drawings, it is to be understood that the embodiments are merely illustrative and various equivalents and modifications are possible without departing from the spirit and scope of the disclosure as defined in the following claims. Hereinafter, embodiments of the present disclosure will be described in detail with reference to the accompanying drawings. Like reference numerals are used herein to designate like elements throughout the various views.

Figure 2:
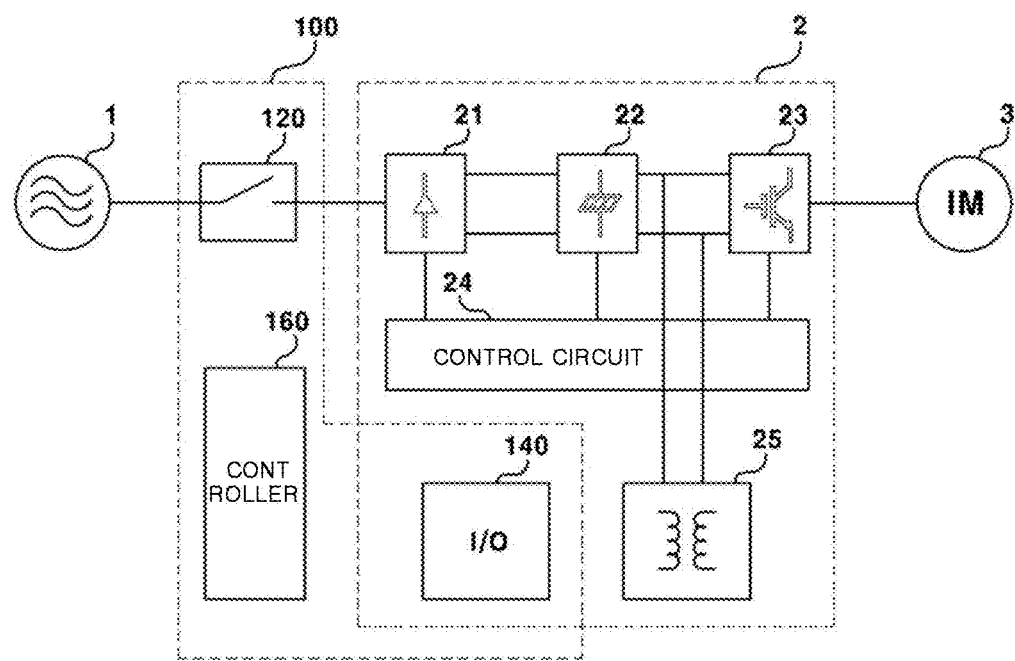
FIG. 2 is a block diagram of an inverter according to an embodiment of the present disclosure.

FIG. 2 is a block diagram of an inverter controller 100 according to an embodiment of the present disclosure. Although the inverter controller 100 and an inverter 2 are shown as separate elements in FIG. 2, it is to be understood that the inverter controller 100 may be integrated with the inverter 2. Operation of the inverter 2 will be described briefly. When power is supplied from a power source 1 to the inverter 2, a three-phase AC power (R, S and T) is input to a converter stage 21 to be converted to DC power, such that a smoothing stage 22 begins to be charged. When the voltage of the smoothing stage increases to reach Vsmps_on or higher, an SMPS 25 begins to operate, such that power used for inverter drive, protection and/or sensing, etc., is generated. When the inverter is driven, a three-phase power (U, V and W) is output to a load 3 according to the state of switches of an inverter stage 23.

The inverter control apparatus 100 according to the embodiment of the present disclosure includes an input power switchgear 120, an I/O unit 140 and a controller 160.

Specifically, as shown in FIG. 2, the input power switchgear 120 is disposed between the input power source 1 and the converter stage 21 of the inverter 2 and may supply input power to the inverter 2 or interrupt the power supplied to the inverter 2 depending on the switching operation.

The I/O unit 140 is connected to the inverter 2 to perform data input/out or the like and may apply a safety signal to the inverter 2 depending on a user control input. In addition, the I/O unit 140 may output a failure output relay signal to the input power switchgear 120 at the time of issuing a safety signal.

In addition, upon receiving a failure output relay signal from the I/O unit 140, the input power switchgear 120 interrupts the input power to the inverter 2. When the input power to the inverter 2 is interrupted, the controller 160 performs control for speeding up the discharging of residual energy at the inverter.

The control for speeding up the discharging of residual energy at the inverter will be described in detail below with reference to the drawings.

The control for speeding up the discharging of residual energy at the inverter according to the embodiment of the present disclosure may be largely divided into a case where the inverter performs current control and a case where the inverter performs V/F control.

Firstly, a control method for speeding up the discharging of a smoothing stage of an inverter performing current control through a DC excitation process will be described with reference to FIG. 3.

Figure 3:
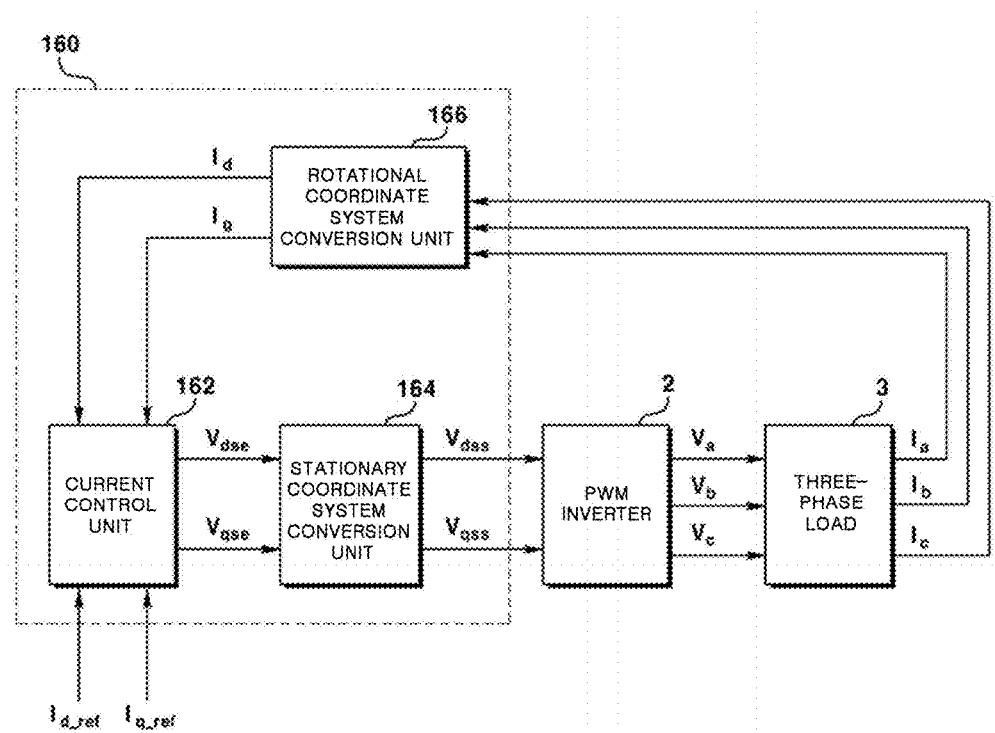
FIG. 3 is a block diagram for illustrating control for speeding up the discharge of the smoothing stage of the inverter performing current control, according to an embodiment of the present disclosure.

As shown in FIG. 3, the controller 160 of the inverter control apparatus 100 according to the embodiment of the present disclosure includes a current control unit 162, a stationary coordinate system conversion unit 164 and a rotational coordinate system conversion unit 166.

Inverter output currents Ia, Ib and Ic are converted from abc coordinate system to d-q rotational coordinate system (Id and Iq) and are input to the current control unit 162. More specifically, the rotational coordinate system conversion unit 166 converts the signals Ia, Ib and Ic on the abc coordinate system to two-phase AC currents Id and Iq on the rotational coordinate system by using Equation 1 below:

$$Id = Ia$$

$$Iq = 1/\sqrt{3}(Ib - Ic) \qquad \text{[Equation 1]}$$

where Id denotes an AC current on d-axis of the rotational coordinate system, and Iq denotes an AC current on q-axis current of the rotational coordinate system.

The current control unit 162 generates voltage command using the inverter output current and current command. The generated voltage command is a voltage command of the rotational coordinate system. The voltage command generated in the current control unit 162 is applied to the stationary coordinate system conversion unit 164.

In addition, the stationary coordinate system conversion unit 164 converts the voltage command of the rotational coordinate system to the voltage command of the stationary coordinate system. More specifically, the stationary coordinate system conversion unit 164 converts a two-phase DC voltage Vdse and Vqse of the rotational coordinate system to a two-phase AC voltage Vdss and Vqss of the stationary coordinate system by using Equation 2 below:

$$Vdss = Vdse \times \cos\theta - Vqse \times \sin\theta$$

$$Vqss = Vdse \times \sin\theta + Vqse \times \cos\theta \qquad \text{[Equation 2]}$$

where Vdss and Vqss are AC voltages of the stationary coordinate system.

In addition, the stationary coordinate system conversion unit 164 applies the converted voltage command of the stationary coordinate system to the PWM inverter 2. The current command input to the current control unit 162 includes a d-axis current command Id_ref and a q-axis current command Iq-ref. In order to perform control for speeding up the discharge of the smoothing stage of the inverter, the d-axis current command Id-ref is set to be equal to the smoothing stage voltage Vcap.

In addition, the q-axis current command Iq-ref is set to be "0" to perform the current control. Such DC excitation process by the inverter may be performed until the inverter triggers the low voltage trip. A detailed description thereof will be made below with reference to FIG. 4.

Figure 4:
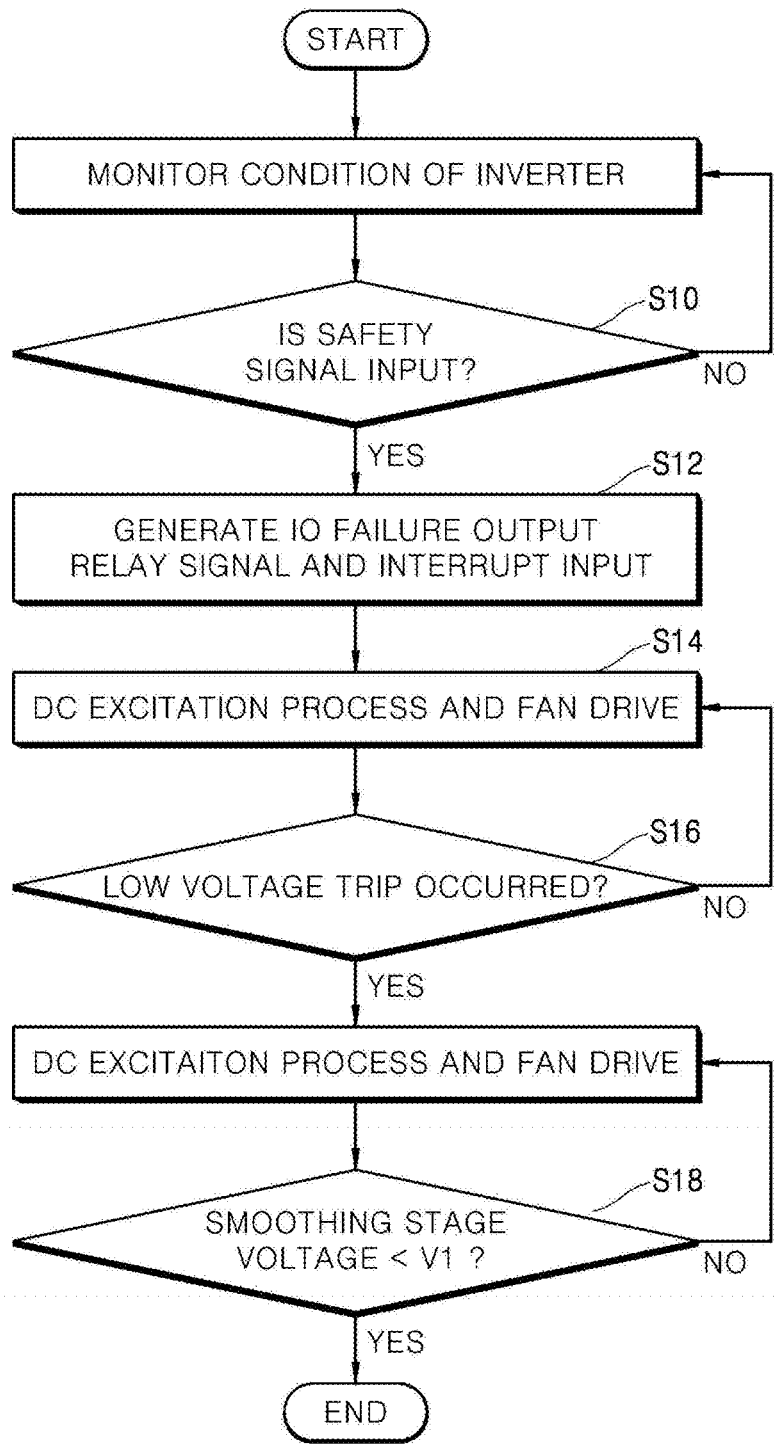
FIG. 4 is a flowchart for illustrating control for speeding up the discharge of the smoothing stage when the inverter performs current control, according to an embodiment of the present disclosure.

FIG. 4 is a flowchart for illustrating a sequence of speeding up the discharge of the smoothing stage at the time of inverter current control.

As shown in FIG. 4, the condition of an inverter is monitored to determine whether a safety signal is generated in the inverter (step S10). If it is determined that a safety signal is generated in the inverter, a failure output relay signal is generated to interrupt input power to the inverter (step S12).

When the input power is interrupted, the above-described DC excitation process is performed (step S14). In addition, a fan may also be driven while the DC excitation process is performed.

Subsequently, it is determined whether a low voltage trip occurs (step S16). If the energy at the smoothing stage of the inverter is discharged and it is determined that the low voltage trip occurs (YES in step S16), the inverter is interrupted and the fan stops, and thus the above-described DC excitation process is performed and the fan is driven again in the low voltage trip mode.

Subsequently, it is determined whether the voltage of the smoothing stage of the inverter is less than a predetermined voltage V1 (step S18). If it is determined that the voltage is less than the predetermined voltage V1 (YES in step S18), the DC excitation process and the fan drive is finished, and accordingly the sequence of discharging the smoothing stage is completed.

In doing so, by setting the predetermined voltage V1 to be larger than the SMPS_off voltage, the sequence of discharging the smoothing stage can be completed while all of the inverter switches are turned off.

Figure 5:
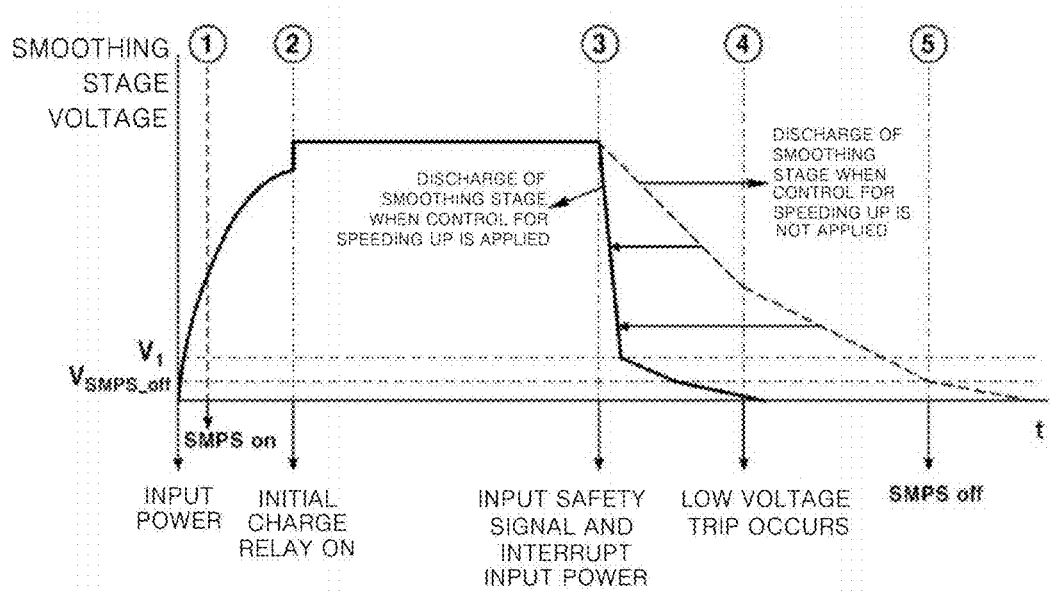
FIG. 5 is a graph showing a smoothing stage voltage profile according to the control of FIG. 4, according to an embodiment of the present disclosure.

A graph showing smoothing stage voltage profile according to input power ON/OFF during the control of the inverter is shown in FIG. 5.

Specifically, when voltage is applied to an inverter, the smoothing stage voltage is gradually charged during an initial charge circuit operation, and the SMPS begins to operate (①). Then, when the smoothing stage is continuously charged to reach a predetermined level, an initial charge relay operates such that the smoothing stage is charged with the voltage equal to the input power (②).

When a safety signal is input to the inverter, the input power is interrupted through the I/O failure output relay signal (③), and the control for speeding up the discharge of the smoothing stage (the DC excitation process and the fan drive) is performed to discharge the smoothing stage.

It is to be noted that the discharge of the smoothing stage is performed even during the low voltage trip mode (④) of the inverter, and thus residual energy can be discharged more quickly than in existing inverters. Then, when the smoothing stage voltage becomes less than V1 (V1>SMPS_off), the sequence is completed.

Hereinafter, control for speeding up the discharge of the smoothing stage of the inverter performing V/F control will be described with reference to FIG. 6.

Figure 6:
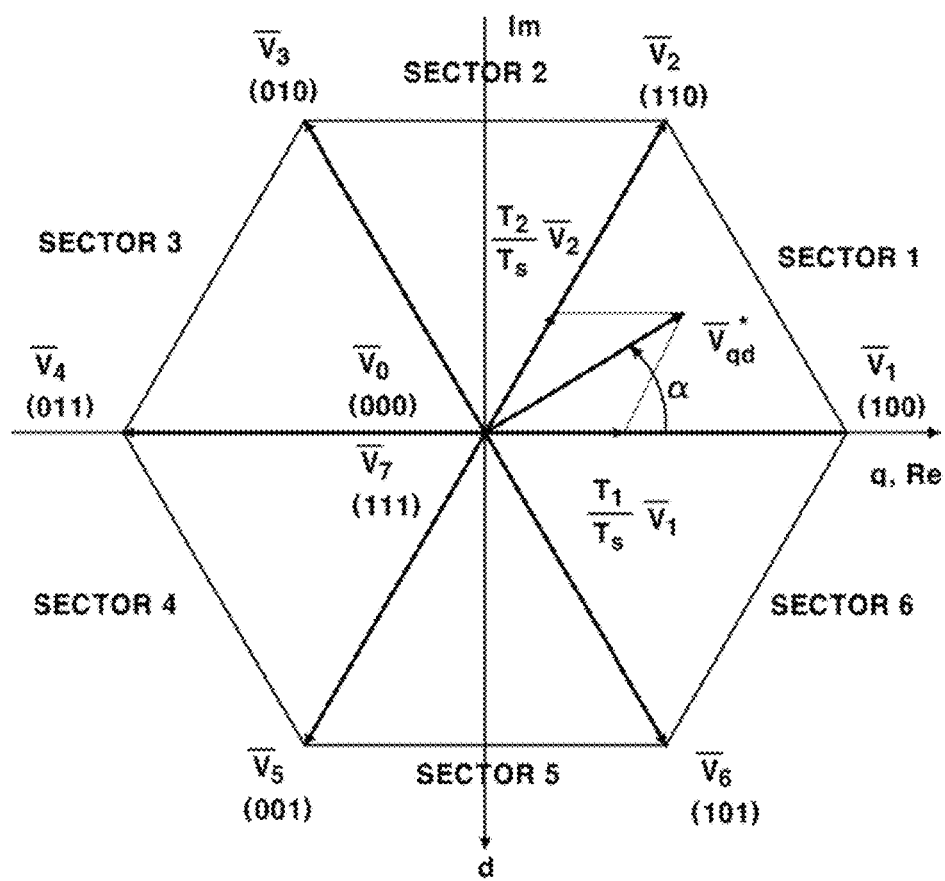
FIG. 6 is a diagram for illustrating an output voltage vector of an inverter expressed in a d-q axis stationary coordinate system, according to an embodiment of the present disclosure.

FIG. 6 is a diagram for illustrating an output voltage vector of an inverter expressed in a d-q axis stationary coordinate system, in which eight output voltage vectors of the inverter are shown.

In a spatial vector voltage modulation scheme, eight output voltage vectors V0 to V7 that may be generated in an inverter for a certain control period are synthesized to generate a voltage equal to the command voltage on average.

Referring to FIG. 6, the voltages V0 and V7 are zero voltage vectors and cannot supply a valid voltage that drives a load, whereas the voltages V1 to and V6 are active voltage vectors and supply a valid voltage that drives the load.

The controller 160 of the inverter control apparatus 100 according to the embodiment of the present disclosure includes a zero vector output unit (not shown), and outputs a zero vector for a predetermined time period when the input power to the inverter is interrupted, such that control for speeding up the discharge of the smoothing stage of the inverter.

In addition, the zero vector may be output until the inverter triggers a low voltage trip, which will be described below in detail with reference to FIG. 7.

Figure 7:
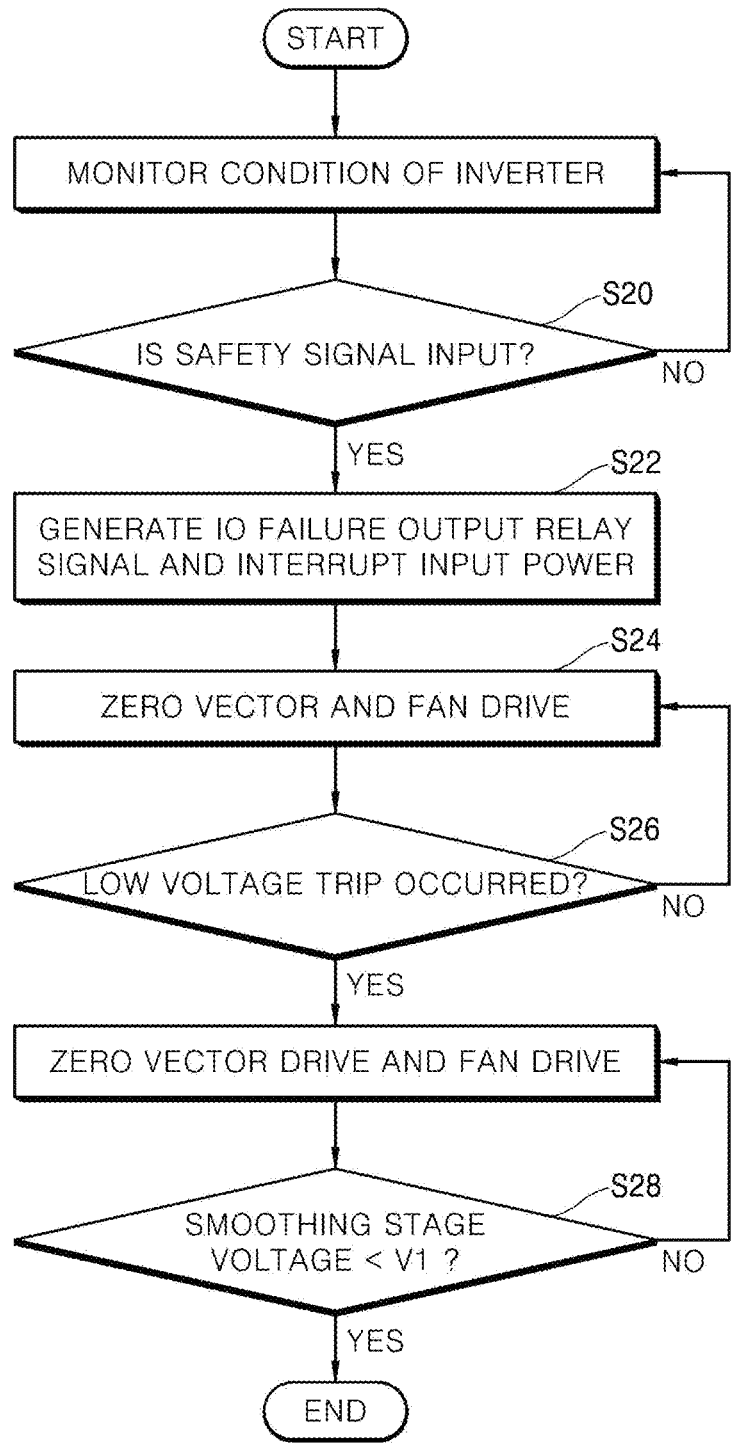
FIG. 7 is a flowchart for illustrating control for speeding up the discharge of the smoothing stage at the time of inverter V/F control, according to an embodiment of the present disclosure.

FIG. 7 is a flowchart for illustrating a sequence of speeding up the discharge of the smoothing stage at the time of inverter V/F control.

As shown in FIG. 7, the condition of an inverter is monitored to determine whether a safety signal is generated in the inverter (step S20). If it is determined that a safety signal is generated in the inverter by a user control input, for example, a failure output relay signal is generated to interrupt input power to the inverter (step S22).

Then, when the input power is interrupted, zero vector drive is performed (step S24). The zero vector drive may be performed by outputting the zero vectors described above with reference to FIG. 6.

The control for speeding up the discharge of the smoothing stage may be performed by driving the fan along with the zero vector drive as shown in the drawings. Subsequently, it is determined whether a low voltage trip occurs (step S26). If the energy at the smoothing stage of the inverter is discharged and it is determined that the low voltage trip occurs (YES in step S26), the inverter is interrupted and the fan stops, and thus the above-described zero voltage drive is performed and the fan is driven again in the low voltage trip mode.

Subsequently, it is determined whether the voltage of the smoothing stage of the inverter is less than a predetermined voltage V1 (step S28). If it is determined that the voltage is less than the predetermined voltage V1 (YES in step S28), the zero voltage drive and the fan drive is finished, and accordingly the sequence of discharging the smoothing stage is completed. In doing so, by setting the predetermined voltage V1 to be larger than the SMPS_off voltage, the sequence of discharging the smoothing stage can be completed while all of the inverter switches are turned off.

Figure 8:
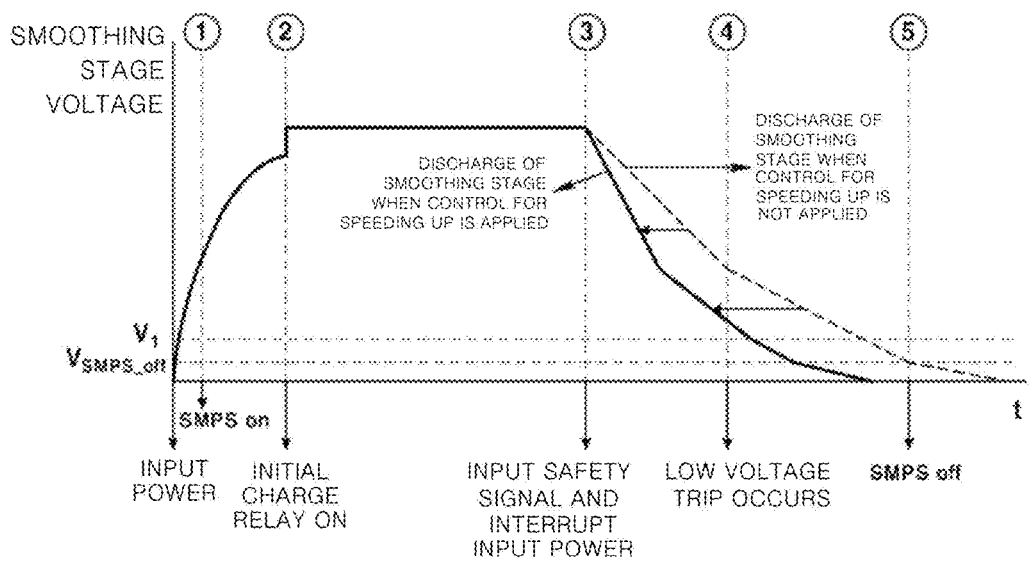
FIG. 8 is a graph showing a smoothing stage voltage profile according to the control of FIG. 7, according to an embodiment of the present disclosure.

A graph showing smoothing stage voltage profile according to input power ON/OFF during the control of the inverter is shown in FIG. 8. When voltage is applied to an inverter, the smoothing stage voltage is gradually charged during an initial charge circuit operation, and the SMPS begins to operate (①). Then, when the smoothing stage is continuously charged to reach a predetermined level, an initial charge relay operates such that the smoothing stage is charged with the voltage equal to the input power (②).

When a safety signal is input to the inverter, the input power is interrupted through the I/O failure output relay signal (③), and the control for speeding up the discharge of the smoothing stage (the zero voltage drive and the fan drive) is performed to discharge the smoothing stage.

It is to be noted that the discharge of the smoothing stage is performed even during the low voltage trip mode (④) of the inverter, and thus residual energy can be discharged more quickly than in existing inverters. Then, when the smoothing stage voltage becomes less than V1 (V1>SMPS_off), the sequence is completed.

As described above, the risk of secondary accidents such as electric shock when an inverter is stopped for an emergency can be reduced. In addition, an inverter control apparatus capable of quickly discharging residual energy at a smoothing stage of an inverter without requiring any additional element such as a discharge resistor can be implemented, as well as a method for controlling the same.

Accordingly, a time taken for resuming service by an inverter can be shortened.

Although the embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. A method for controlling an inverter driven with an input power, to speed up residual energy discharge at the inverter when a safety signal is input to the inverter, the method comprising:
   determining whether the safety signal is input to the inverter;
   generating an I/O failure output relay signal to interrupt the input power if it is determined that the safety signal is input; and
   performing a process of discharging residual energy at a smoothing stage of the inverter and fan drive,
   wherein when the inverter performs current control, the process of discharging the residual energy comprises:
   performing a DC excitation process;
   determining whether a low voltage trip occurs in the inverter; and
   determining whether a voltage of the smoothing stage of the inverter is less than a predetermined voltage.

2. The method of claim 1, wherein the performing the DC excitation process comprises:
   converting currents in an abc coordinate system output from the inverter to currents in a rotational coordinate system;
   generating a voltage command in the rotational coordinate system by using the currents in the rotational coordinate system and a current command;
   converting the voltage command in the rotational coordinate system to the voltage command in a stationary coordinate system; and
   applying the voltage command in the stationary coordinate system to the inverter.

3. The method of claim 2, wherein the current command comprises a d-axis current command having a value equal to the voltage of the smoothing stage of the inverter and a q-axis current command having a value equal to zero.

4. The method of claim 1, wherein the determining whether the low voltage trip occurs in the inverter comprises resuming the DC excitation process and the fan drive if it is determined that the low voltage trip occurs.

5. The method of claim 1, wherein the determining whether the voltage at the smoothing stage of the inverter is less than the predetermined voltage comprises completing the DC excitation process and the fan drive if it is determined that the voltage of the smoothing stage of the inverter is less than the predetermined voltage.

6. A method for controlling an inverter driven with an input power, to speed up residual energy discharge at the inverter when a safety signal is input to the inverter, the method comprising:
   determining whether the safety signal is input to the inverter;
   generating an I/O failure output relay signal to interrupt the input power if it is determined that the safety signal is input; and
   performing a process of discharging residual energy at a smoothing stage of the inverter and fan drive,
   wherein when the inverter performs V/F control, the process of discharging the residual energy comprises:
   performing zero vector drive;
   determining whether a low voltage trip occurs in the inverter; and
   determining whether a voltage of the smoothing stage of the inverter is less than a predetermined voltage.

7. The method of claim 6, wherein the determining whether the low voltage trip occurs in the inverter comprises resuming the zero vector drive and the fan drive if it is determined that the low voltage trip occurs.

8. The method of claim 6, wherein the determining whether the voltage at the smoothing stage of the inverter is less than the predetermined voltage comprises
   completing the DC excitation process or zero the vector drive and the fan drive if it is determined that the voltage of the smoothing stage of the inverter is less than the predetermined voltage.

9. The method of claim 8, wherein the predetermined voltage is larger than an SMPS_off voltage of the inverter.

* * * * *